H. L. BILL.
ACCELERATOR FOOT REST.
APPLICATION FILED SEPT. 2, 1915.

1,218,047.

Patented Mar. 6, 1917.

INVENTOR
Harry L. Bill
BY
Stuart C. Barnes
ATTORNEY

Witness:—

UNITED STATES PATENT OFFICE.

HARRY L. BILL, OF DETROIT, MICHIGAN.

ACCELERATOR FOOT-REST.

1,218,047.  Specification of Letters Patent.  Patented Mar. 6, 1917.

Application filed September 2, 1915. Serial No. 48,623.

*To all whom it may concern:*

Be it known that I, HARRY L. BILL, a citizen of the United States, residing at Detroit, county of Wayne, State of Michigan, have invented a certain new and useful Improvement in Accelerator Foot-Rests, and declare the following to be a full, clear, and exact description of the same, such as will enable others skilled in the art to which it pertains to make and use the same, reference being had to the accompanying drawings, which form a part of this specification.

This invention relates to an accelerator foot-rest. It comprises a rocking member which is adapted to fit in between the heel and the toe of a shoe to provide a support for the foot when operating the accelerator pedal of an automobile.

The foot of the driver of an automobile becomes very tired when being constantly used to control the speed of the car by means of the accelerator pedal or foot throttle. Various expedients have been devised to relieve this foot fatigue and leg strain but so far as I am aware they have not been uniformly successful. The device which I have designed not only serves in connection with the accelerator pedal as a foot-rest but also serves to protect the accelerator pedal from unintended and accidental thrusts due to sudden jolting of the car. The structure and the advantages will more fully appear in the description following.

In the drawings,—

Figures 1, 2, 3:
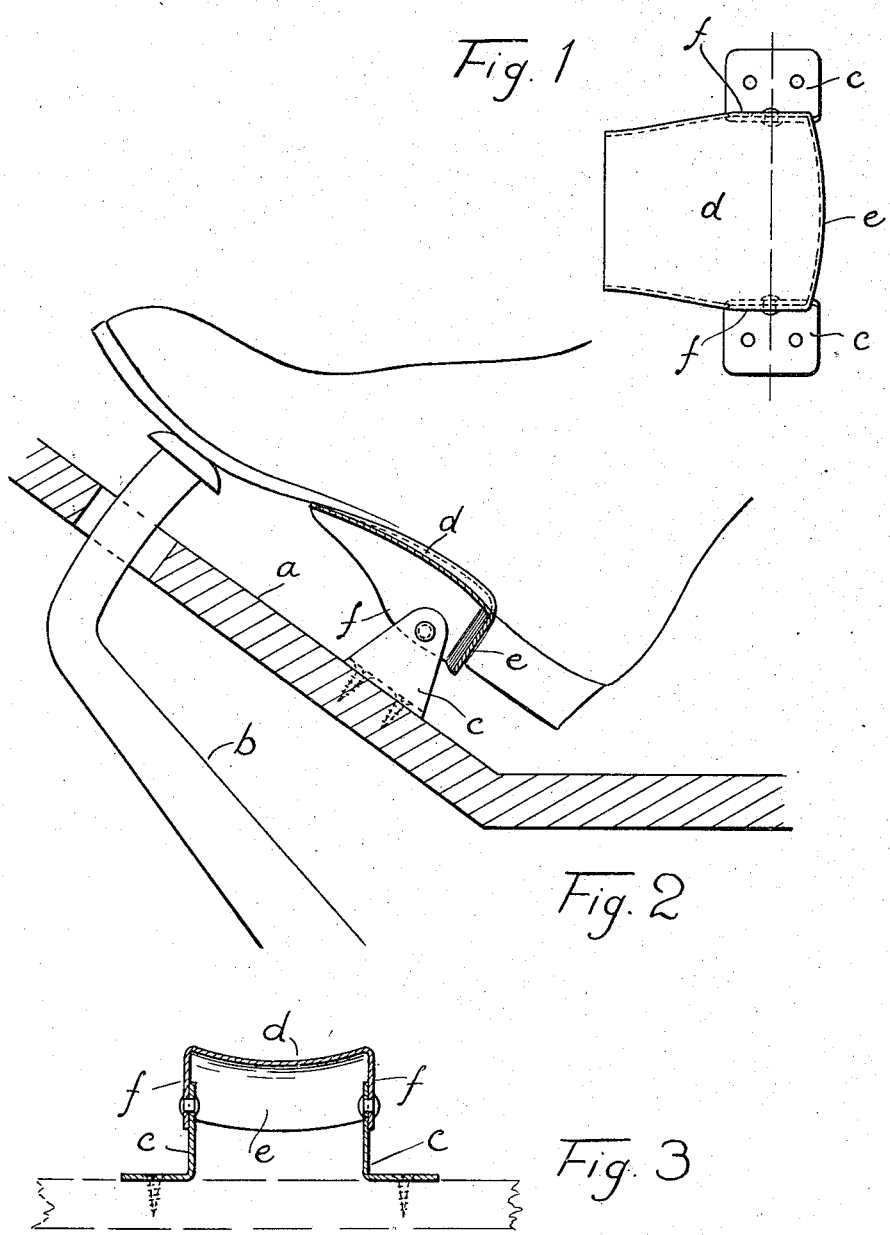
Figure 1 is a plan view of the rocking foot-support.
Fig. 2 is a sectional view of the foot-board or floor of a driver's compartment in an automobile, showing the rocking foot-rest in section and the accelerator pedal in elevation.
Fig. 3 is a cross section of the rocking foot-rest.

*a* designates the foot-board of an automobile; *b* the accelerator pedal, which is here shown in the button form, but of course my invention is applicable to the pedal type or any other type of accelerator lever. *c, c* represent a pair of ankle metal brackets which can be screwed or otherwise secured to the floor of the driver's compartment. The rocking member *d* comprises a metal plate bent over at the sides and rear and concaved at the top. The rear flange *e* is designed to engage the front of the heel on one's shoe. The side flanges *f, f* are loosely riveted to the uprights of the bracket *c, c* so that the rest *d* may rock upon the brackets and supports. Of course the exact design of the rest *d* may be varied and the material out of which it is constructed may be varied without departing from the essential features of my invention. So also the pivotal mounting may be varied.

The rocking foot-support is so located with respect to the accelerator button or pedal that when the rest is in the arch of the shoe between the heel and toe, the toe of the shoe rests upon the buttton as shown in Fig. 2. Of course the accelerator pedals or buttons are located in various places on various cars, and the rocking-support might in some cases have to be located upon the horizontal portion of the car floor.

When the car is given a severe jolt, as often happens when passing over an obstruction, the foot is jolted and results in a sudden thrust upon the accelerator pedal, resulting in opening the throttle valve at just the time when it should not be opened. This is substantially eliminated by my invention, as most of the thrust will be borne by the brackets when the foot is driven forward and the heel strikes the rocking-rest in substantially the line of dead center. It will be found that my invention materially lessens the strain on the foot and the cords of the leg by reason of supporting the foot in an elevated plane, materially removed radially from the axis of pivoting. The reason for this is that the arc described by the foot in effecting a given thrust to the accelerator pedal has a large radius; hence the compound movement of the joints of the leg is largely a movement at the knee and hip, while the stiff ankle joint rides through the arc of large radius with a comparatively small movement. When the accelerator lever is operated without a rest of this character, the foot is obliged to pivot on the heel, in fact, on the rear of the heel, which strains the cords of the leg much more severely and tires them much more than when the foot is allowed to pivot on a point considerably farther forward as is provided by my invention.

What I claim is:

1. A foot rest for use in connection with foot controls, having in combination, a pivotal support, and a foot-supporting member having a foot supporting surface shaped to fit into the arch of one's shoe and having a concavity in its upper surface tending to prevent sidewise movement of the foot, said foot-supporting surface being supported materially above the pivotal support about which it rocks.

2. A foot rest for use in connection with foot controls, having in combination, a pivotal support, and a foot-supporting member for supporting one's shoe at the arch, the said foot-supporting member being rockingly supported on said pivotal support on an axis transverse to one's foot and the foot-supporting surface of the said foot-supporting member being materially removed radially from the swinging axis.

3. A foot rest for use in connection with foot controls, having in combination, a pair of upright brackets, and a foot-supporting member shaped to fit in the arch of one's shoe and pivotally supported on said brackets with the foot-supporting surface materially removed radially from the axis of pivoting.

4. A foot rest for use in connection with foot controls, having in combination, a pair of upright brackets and a plate provided with turned-over sides pivotally secured to said bracket at points somewhat removed radially from the foot supporting surface of said plate, the said plate being arranged to fit into the arch of one's shoe and the pivoting being on an axis transverse of the foot.

5. A foot rest for use in connection with foot controls, having in combination, a pivotal support and a foot-supporting member, comprising a plate turned over at the sides and pivotally secured to the top of said brackets and turned over at the rear, the said foot-supporting member being arranged to fit into the arch of one's shoe and affording a foot-supporting member radially removed from the axis of pivoting which lies transversely of the foot.

In testimony whereof, I sign this specification.

HARRY L. BILL.

Copies of this patent may be obtained for five cents each, by addressing the "Commissioner of Patents, Washington, D. C."